United States Patent
Omari et al.

(10) Patent No.: US 11,415,992 B2
(45) Date of Patent: Aug. 16, 2022

(54) RESOURCE PRIORITIZATION BASED ON TRAVEL PATH RELEVANCE

(71) Applicant: Woven Planet North America, Inc., Los Altos, CA (US)

(72) Inventors: Sammy Omari, Los Altos, CA (US); Ana Sofia Rufino Ferreira, Berkeley, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 308 days.

(21) Appl. No.: 16/729,124

(22) Filed: Dec. 27, 2019

(65) Prior Publication Data

US 2021/0200221 A1 Jul. 1, 2021

(51) Int. Cl.
*G05D 1/02* (2020.01)
*G06N 7/00* (2006.01)
*G05D 1/00* (2006.01)

(52) U.S. Cl.
CPC ......... *G05D 1/0212* (2013.01); *G05D 1/0088* (2013.01); *G06N 7/005* (2013.01); *G05D 2201/0212* (2013.01); *G05D 2201/0213* (2013.01)

(58) Field of Classification Search
USPC .......................................................... 701/25
See application file for complete search history.

(56) References Cited

U.S. PATENT DOCUMENTS 11,087,477 B2* 8/2021 Choi ........................ G06N 3/08
11,195,418 B1* 12/2021 Hong ................... G05D 1/0276
2016/0247109 A1* 8/2016 Scicluna .......... G06Q 10/06315
2019/0066506 A1* 2/2019 Kazemi ............. B60W 30/0956
2019/0258251 A1* 8/2019 Ditty .................. G06K 9/00805
2019/0333381 A1* 10/2019 Shalev-Shwartz ...........................
B60W 50/0097

(Continued)

FOREIGN PATENT DOCUMENTS

JP          2019068411 A    4/2019
KR        20190102144 A    9/2019
WO    WO 2017079311 A1    5/2017

OTHER PUBLICATIONS

International Search Report and Written Opinion for International Application No. PCT/US2020/066487, dated Apr. 6, 2021.

*Primary Examiner* — Yazan A Soofi
(74) *Attorney, Agent, or Firm* — Christopher G. Darrow; Darrow Mustafa PC

(57) ABSTRACT

In one embodiment, a method includes accessing sensor data associated with an environment of the vehicle; identifying agents in the environment based on the sensor data; determining a probability distribution indicative of whether a preliminary trajectory of each of the agents intersects a potential travel space of the vehicle; generating a prioritization of the agents based on the probability distribution; allocating an amount of computing resources of the vehicle for analyzing each of one or more of the agents based on the prioritization and characteristics of the respective one or more agents; and predicting a trajectory of one or more of the agents according to the allocated computing resources. An accuracy of the prediction is proportional to the amount of allocated computing resources. The method also includes determining, based on the analysis of the agents, one or more operations for the vehicle to perform.

20 Claims, 9 Drawing Sheets

(56) References Cited

U.S. PATENT DOCUMENTS

| | | | |
|---|---|---|---|
| 2019/0369637 A1* | 12/2019 | Shalev-Shwartz | ........................... B60W 60/0011 |
| 2019/0391580 A1* | 12/2019 | Di Cairano | ............ G08G 1/166 |
| 2019/0391637 A1* | 12/2019 | Taylor | .................... A63F 13/213 |
| 2020/0065711 A1* | 2/2020 | Clement | .............. G06N 3/0454 |
| 2021/0046924 A1* | 2/2021 | Caldwell | ............ G06K 9/00805 |
| 2021/0166145 A1* | 6/2021 | Omari | .................... G08G 1/166 |

* cited by examiner

Uniform Resource Allocation

| Agent | Encroachment Probability (%) | Resource allocated |
|---|---|---|
| 104A | 35 | 25% processor capacity<br>25% processing time |
| 104B | 4 | 25% processor capacity<br>25% processing time |
| 104C | 0.5 | 25% processor capacity<br>25% processing time |
| 104D | 10 | 25% processor capacity<br>25% processing time |

*FIGURE 2A*

Resource Prioritization Allocation

| Agent | Encroachment Probability (%) | Resource allocated |
|---|---|---|
| 104A | 35 | 74% processor capacity<br>83% processing time |
| 104B | 4 | 6% processor capacity<br>2% processing time |
| 104C | 0.5 | 0% processor capacity<br>0% processing time |
| 104D | 10 | 20% processor capacity<br>15% processing time |

*FIGURE 2B*

RESOURCE PRIORITIZATION BASED ON TRAVEL PATH RELEVANCE

BACKGROUND

Different levels of driving by vehicles with a control system are becoming increasingly commonplace. Driving-control systems include several hardware and software modules to perform different aspects of driving a vehicle. Successful driving using a driving-control system involves a multitude of potential vehicle actions based on the predicted actions of agents in the area surrounding the vehicle. These actions by the agents may affect whether the driving-control system directs the vehicle to accelerate, maintain speed, or decelerate while navigating a particular section of a route. For example, a vehicle, when navigating to a destination, may take into consideration the likelihood that one or more agents may interact with the vehicle. This consideration may affect whether the driving-control system directs the vehicle to accelerate, maintain speed, decelerate, or perform some other maneuver.

Driving-control systems have a limited computational budget (e.g., in terms of time and power) for performing critical navigation functions, such as, for example, perception of agents in the surrounding environment or prediction of the future locations of these agents. Typically, a perception module of a driving-control system generates a representation of the current state of the vehicle's environment and a prediction module processes the current state to predict the future locations of various agents that may be hazards to the vehicle. This behavior allocates the same amount of computational resources or budget for all agents within the environment, which may not be optimal from a resource-allocation standpoint.

BRIEF DESCRIPTION OF THE DRAWINGS

FIG. 2A illustrates an example uniform resource allocation.

FIG. 2B illustrates an example resource prioritization allocation.

DESCRIPTION OF EXAMPLE EMBODIMENTS

Figure 1A:
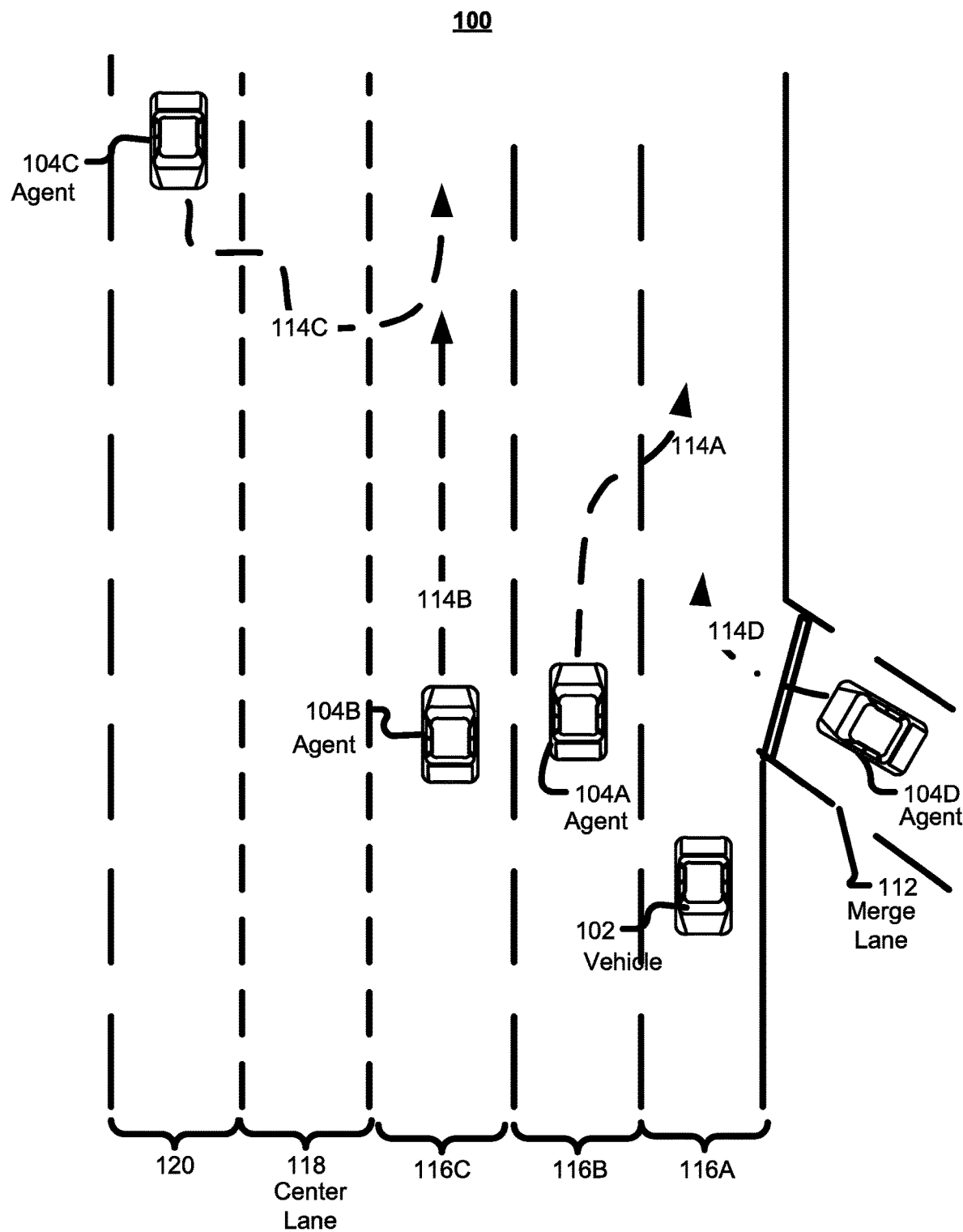
FIG. 1A illustrates an example vehicle navigating a route.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject-matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Subject-matter described herein is generally directed to a prioritization model that determines a prioritization of agents within the environment and, accordingly, allocates resources to monitor and make predictions for the highest priority agents. For example, the prioritization of agents may be determined prior to a prediction phase so that the computational budget or system resources used for prediction could be optimally allocated (e.g., the highest priority agents will be given more budget or resources). Previous methods of determining prioritization of agents involved the use of heuristics or rules-based analysis. This heuristic approach is resource-intensive and is prone to errors.

Driving-control systems may include software and hardware modules that include fully autonomous vehicle navigation systems, advanced driver assist systems (ADAS) or other semi-autonomous computing systems that include capabilities to predict the behavior of the agents on the road. Successful driving using a driving-control system involves a multitude of potential vehicle actions based on the predicted actions of agents in the area surrounding the vehicle. For this reason, agents with the highest likelihood of intersecting the potential travel space of a vehicle should be tracked with the highest fidelity (precision), while objects outside potential travel space may not require tracking with high fidelity. In particular embodiments, a driving-control system may identify the agents most relevant to the vehicle based on the probability that the agent will enter potential travel space (driving surface) of the vehicle within a pre-determined amount of time (e.g., 1-3 seconds, 3-5 seconds, or 5-10 seconds).

In particular embodiments, the computing resources of the driving-control system should prioritize how to most accurately determine the trajectory and behavior of agents having the highest probability of encroaching into the potential travel space of the vehicle, while ignoring or allocating minimal resources to agents with the lowest probability of interacting with the vehicle. As an example and not by way of limitation, an agent activating a turn indicator in a lane adjacent to the vehicle may have the highest probability of interacting with the vehicle, while an agent on the opposite side of the road and moving in the opposite direction may have a minimal probability of interacting with the vehicle. In particular embodiments, based on a representation of the contextual environment of the vehicle, for each agent, the system may generate a predicted probability distribution (e.g., as a function of time) that indicates the likelihood of a particular agent may enter into an area that the current vehicle may travel (potential travel space).

As described in more detail below, a perception module of a control-system navigation pipeline may include a prioritization model to determine the probability distribution that agents in the surrounding area will have a predicted trajectory that will encroach or intersect the potential travel space of the vehicle. In particular embodiments, based on the probability distributions, the prioritization model may provide a prioritized list of the agents for subsequent processing by a prediction module of the driving-control system navigation pipeline. As an example and not by way of limitation, the agents that are most likely to enter into potential travel space of the vehicle may be given more computing resources (e.g., time or system resources) to more accurately predict the behavior of these agents.

FIG. 1A illustrates an example vehicle navigating a route. In a particular scenario 100, a vehicle 102 may be on a road with a number of lanes 116A-116C for traffic flowing in the direction of vehicle 102 and one or more lanes 120 for traffic flowing in the direction opposite vehicle 102. Lanes 116A-116C for traffic flowing in the direction of vehicle 102 and one or more lanes 120 for traffic flowing in the direction opposite vehicle 102 are separated by a center left-turn lane 118. As illustrated in the example of FIG. 1A, agent 104A is in lane 116B adjacent vehicle 102 in lane 116A, agent 104B is in lane 116C adjacent center left-turn lane 118, agent 104D is approaching a merge onto lane 116A from merge lane 112, and agent 116C in lane 120 moving in the direction opposite vehicle 102. Vehicle 102 may include a driving-control system that monitors information of vehicle 102 and agents 104A-104D within detection range of the sensors, for example, the velocity, the moving direction, the acceleration, the distance to stop line, the distance to the road line, or any suitable vehicle information of vehicle 102 or agents 104A-104D.

In particular embodiments, the perception module of the driving control-system navigation pipeline of vehicle 102 may include a prioritization model that is configured to determine a preliminary prediction of predicted paths 114A-114D of agents 104A-104D at predetermined periods of time (e.g., 0.1 seconds or 0.2 seconds) in the future. In particular embodiments, a perception module of the control-system navigation pipeline, described in more detail below, may generate one or more raster images for the vehicle environment (e.g., an intersection) that may include vehicle 102, stop lines, road lines, agents 104A-104D, etc. The raster image may be a top-view image and may have multiple channels for different layers of environmental information. The first channel of the image may include but is not limited to, road lines, crosswalks, curbs, sidewalks, road edge areas beyond the road, etc. A second channel of the raster image may include information associated the traffic, road, vehicle 102 (e.g., location, relative positions to surrounding objects), stop lines, traffic signals, road signs, etc. A third channel of the raster image may include information related to agents, for example, predicted paths 114A-114D of agents 104A-104D that may include velocities, moving directions, accelerations, turning indicator statuses, interactions, etc. In particular embodiments, this raster image may be provided to the prioritization model of the control-system navigation pipeline. Although this disclosure describes and illustrates a particular form of encoding the contextual information (e.g., raster image), this disclosure contemplates any suitable form of encoding the contextual information, such as for example an object list or a vector or matrix of numerical values, with each value in the vector/matrix corresponding to a predetermined category of information, as described below in more detail.

Figure 1B:
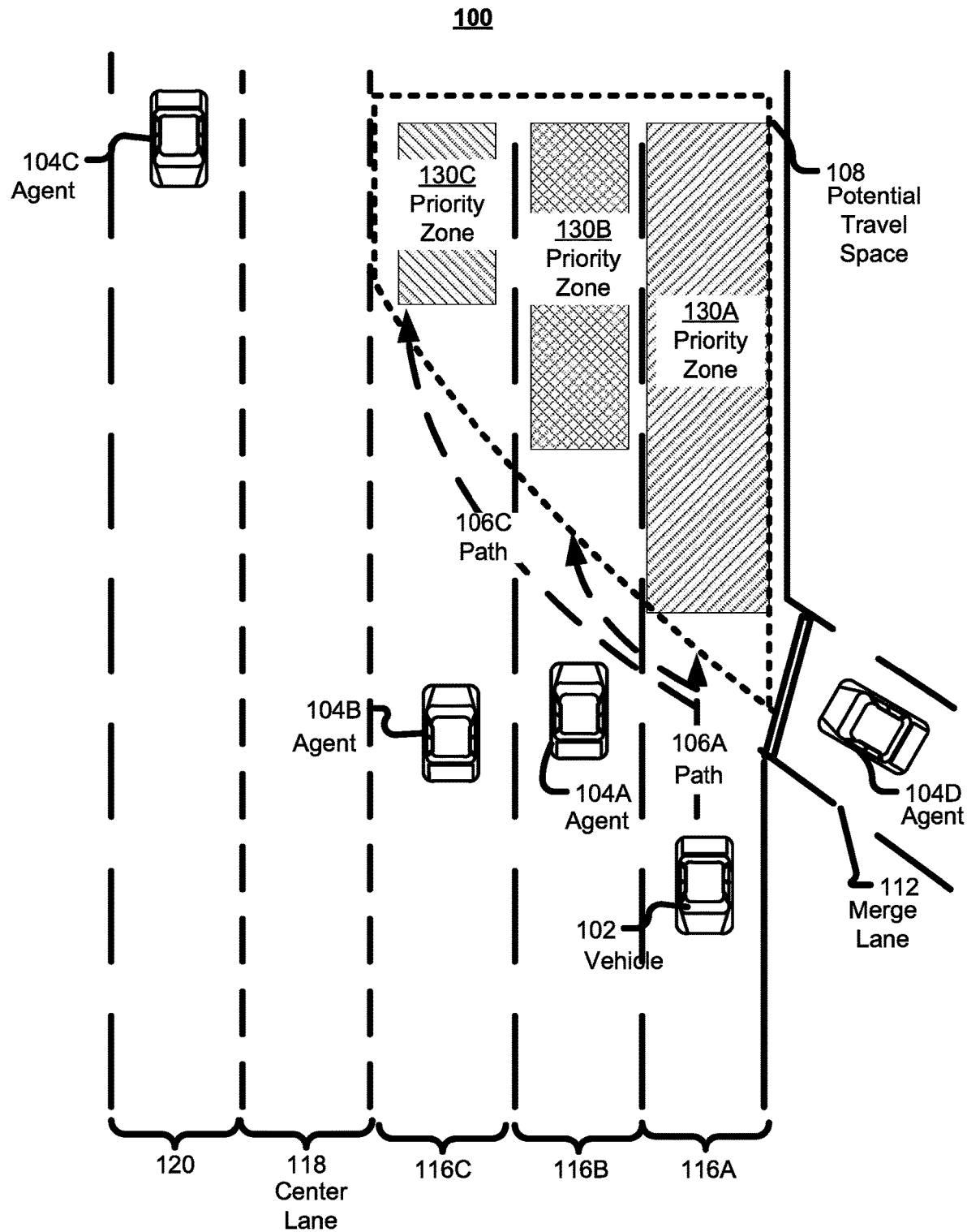
FIG. 1B illustrates an example a potential travel space of a vehicle with priority zones.

FIG. 1B illustrates an example of a potential travel space of a vehicle with priority zones. As described in more detail below, a driving-control system navigation pipeline of vehicle 102 may determine candidate travel paths and particular driving operations (e.g., deceleration, acceleration, swerving, etc.) for vehicle 102 to successfully navigate to its destination. In particular embodiments, the candidate travel paths are determined based on the current navigation route and the environment e.g., agents 104A-104D). A planning module of the driving-control system may utilize a contextual representation (e.g., predicted locations or trajectories of agents, semantic data, etc.) and any other available information (e.g., map data, traffic data, accident reports, weather reports, target destinations, and any other suitable information) to determine one or more goals or candidate travel paths 106A-106C for vehicle 102. As an example and not by way of limitation, the driving-control system may determine candidate travel paths 106A-106C and associated driving operations for the vehicle to avoid possible collisions with agents 104A-104D.

In particular embodiments, the driving-control of vehicle 102 may determine a potential travel space 108 of vehicle 102. Potential travel space 108 of vehicle 102 may be an area whose boundary may be defined by candidate travel paths 106A-106C that vehicle 102 may traverse within a predetermined time period. In particular embodiments, potential travel space 108 may have different priority zones 130A-130C for use in resource prioritization based on the probability distribution of agents 104A-104D entering the different priority zones or the probability that vehicle 102 travels in the particular priority zone. As an example and not by way of limitation, priority zones 130A-130C corresponding to higher probability candidate travel paths 106A-106C may have a higher associated priority. In particular embodiments, tracking the trajectory of agents 104A-104D with a significant probability of entering priority zones 130A-130C having a higher associated priority may be assigned additional computing resources. As described below in more detail, for each agent 104A-104D, the driving-control system of vehicle 102 may generate a probability distribution (e.g., as a function of time) that indicates the likelihood that one or more agents 104A-104D will enter potential travel space 108 of vehicle 102.

In particular embodiments, the perception module of the driving control-system navigation pipeline of vehicle 102 may include a prioritization model that is configured to predict the trajectory or behavior of agents 104A-104D at predetermined periods of time (e.g., 0.1 seconds or 0.2 seconds) in the future. A prioritization model of the driving-control system may use the output of the perception model to provide a preliminary prediction of the actions of agents 104A-104D and determine a probability distribution that the actions of agents 104A-104D will encroach on potential travel space 108. In particular embodiments, the prioritization model may be trained through machine learning (ML) and may determine conditions where predicted paths 114A-114D of agents 104A-104D may intersect potential travel space 108. As an example and not by way of limitation, the prioritization model may predict that agent 104A may merge into lane 116A based on predicted path 114A of agent 104A.

As another example, the prioritization model may predict agent 104B will proceed on its current heading based on predicted path 114B. As another example, the prioritization model may predict agent 104C may proceed to merge into center left-turn lane 118 and make a U-turn following path 114C. As another example, the prioritization model may predict agent 104D may merge into lane 116A along path 114D from merge lane 112. As described in more detail below, the prioritization model may determine a ranking of agents 104A-104D for use by the prediction module of the control-system navigation pipeline.

FIG. 2A illustrates an example uniform resource allocation. In particular embodiments, a prioritization model may determine the probability of one or more agents encroaching on or intersecting the potential travel space of a vehicle. Based on the scenario illustrated in the example of FIG. 1A, agents 104A and agents 104D may have the highest probability of encroaching on the potential travel space of the vehicle, while agents 104B and 104C may have a relatively low probability of encroaching on the potential travel space of the vehicle. In a uniform resource allocation scheme, the computing resources (e.g., processing capacity, power, or processing time) of the vehicle is uniformly allocated to predict the trajectory of all agents 104A-104D regardless of the probability of the agents 104A-104D encroaching on the potential travel zone of the vehicle. As illustrated in the example of FIG. 2A, assuming all of the computing resources of the vehicle may be allocated to the trajectory prediction of agents 104A-104D, the computing system of the vehicle allocates 25% of the computing resources to determine the trajectory of each agent 104A-104D.

FIG. 2B illustrates an example resource prioritization allocation. In particular embodiments, a prediction module of a driving-control system navigation pipeline may allocate computing resources to monitor and make predictions of agents based on the output of a prioritization model. The data of the prioritization of agents may be provided to the prediction module of the control-system navigation pipeline so that the computational budget or system resources used during prediction may be optimally allocated (e.g., the highest priority agents will be given more budget or resources). In contrast to the uniform resource allocation scheme illustrated in the example of FIG. 2A, a resource prioritization allocation scheme may allocate computing resources based on the probability of encroaching on the potential travel space of the vehicle. As an example and not by way of limitation, the computing system of the vehicle may allocate the largest percentage of computing resources to determine the trajectory of the agents with the highest encroachment probability (e.g., agent 104A and agent 104D), while allocating minimal computing resources to determine the trajectory of the agents with the highest encroachment probability (e.g., agent 104B and agent 104C). In particular embodiments, the computing system of the vehicle may allocate different resources to predict the trajectory of the agents. As an example and not by way of limitation, the computing system of the vehicle may use a high-performance processor to predict the trajectory of high probability agents and a low-performance processor to predict the trajectory of low probability agents. As another example, the computing system of the vehicle may use a combination of data from LiDAR and optical cameras to predict the trajectory of high probability agents, while only using data from the optical camera to predict the trajectory of low probability agents. As illustrated in the example of FIGS. 2A-2B, the uniform resource allocation would over-allocate processor capacity and processing time to relatively low probability agents (e.g., agent 104B and agent 104C) and divert these computing resources from providing more accurate trajectory predictions for relatively high probability agents (e.g., agent 104A and agent 104D).

Figure 3:
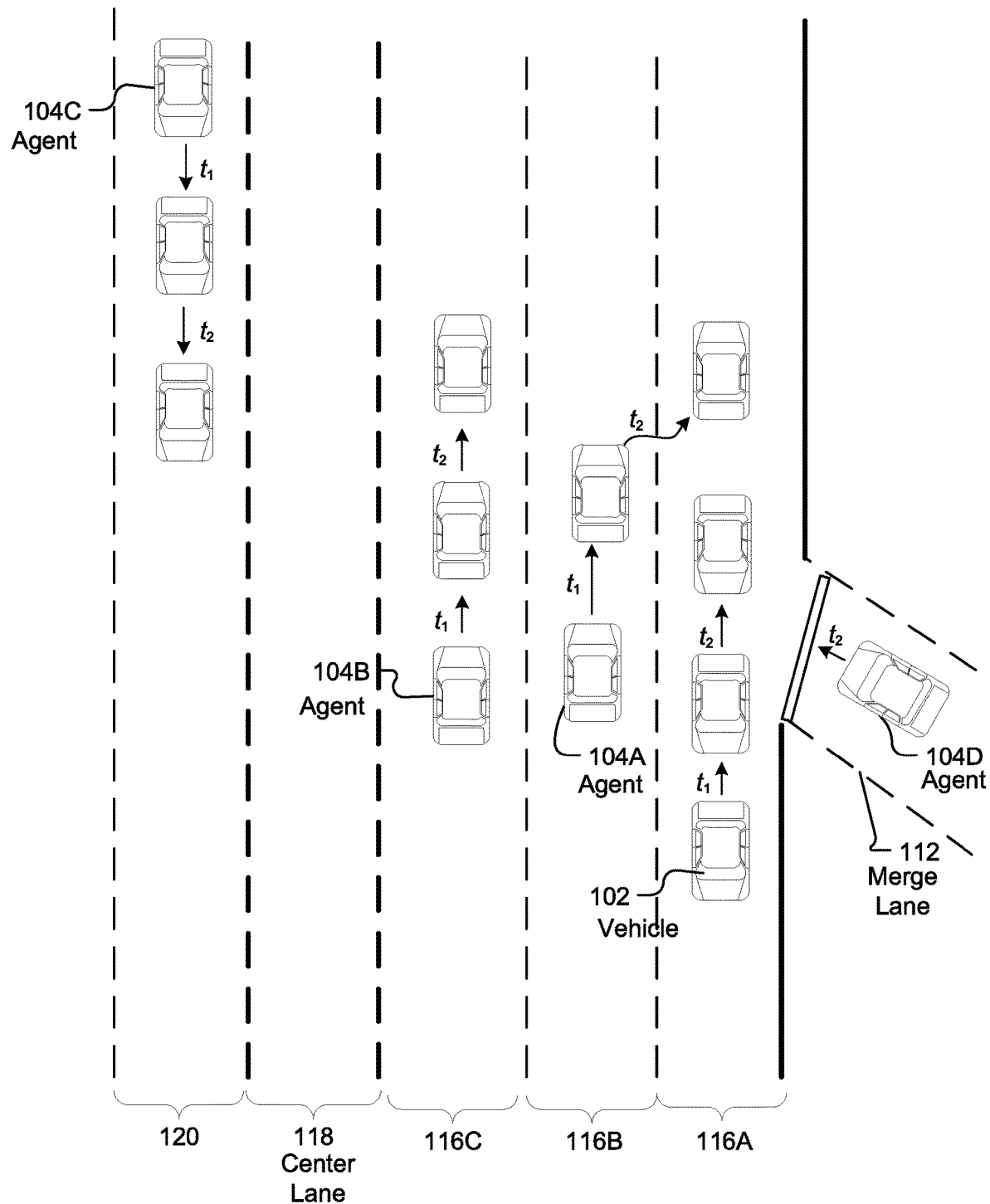
FIG. 3 illustrates an example contextual environment representation at various times.

FIG. 3 illustrates an example contextual environment representation at various times. In particular embodiments, the ground-truth used to train a prioritization model may be generated based on the regression of known state information. As an example and not by way of limitation, prerecorded sensor data indicating the locations of all the agents at different times t, $t_1$, $t_2$, etc. may be used to generate the ground-truth for the prioritization model. As illustrated in the example of FIG. 3, between time t and time $t_1$, agents 104A-104C have advanced in their respective lanes 116B-116C and 120, while agent 104D is stationary in merge lane 112. At time $t_2$, agents 104B and 104C have advanced in their respective lanes 116C and 120, while agent 104A has merged into lane 116A and agent 104D is moved closer to the stop line in merge lane 112. Based on the prerecorded sensor data indicating the locations of all the agents at time $t_1$, $t_2$, etc. the ground-truth for determining the accuracy of the prediction may be generated.

Figure 4:
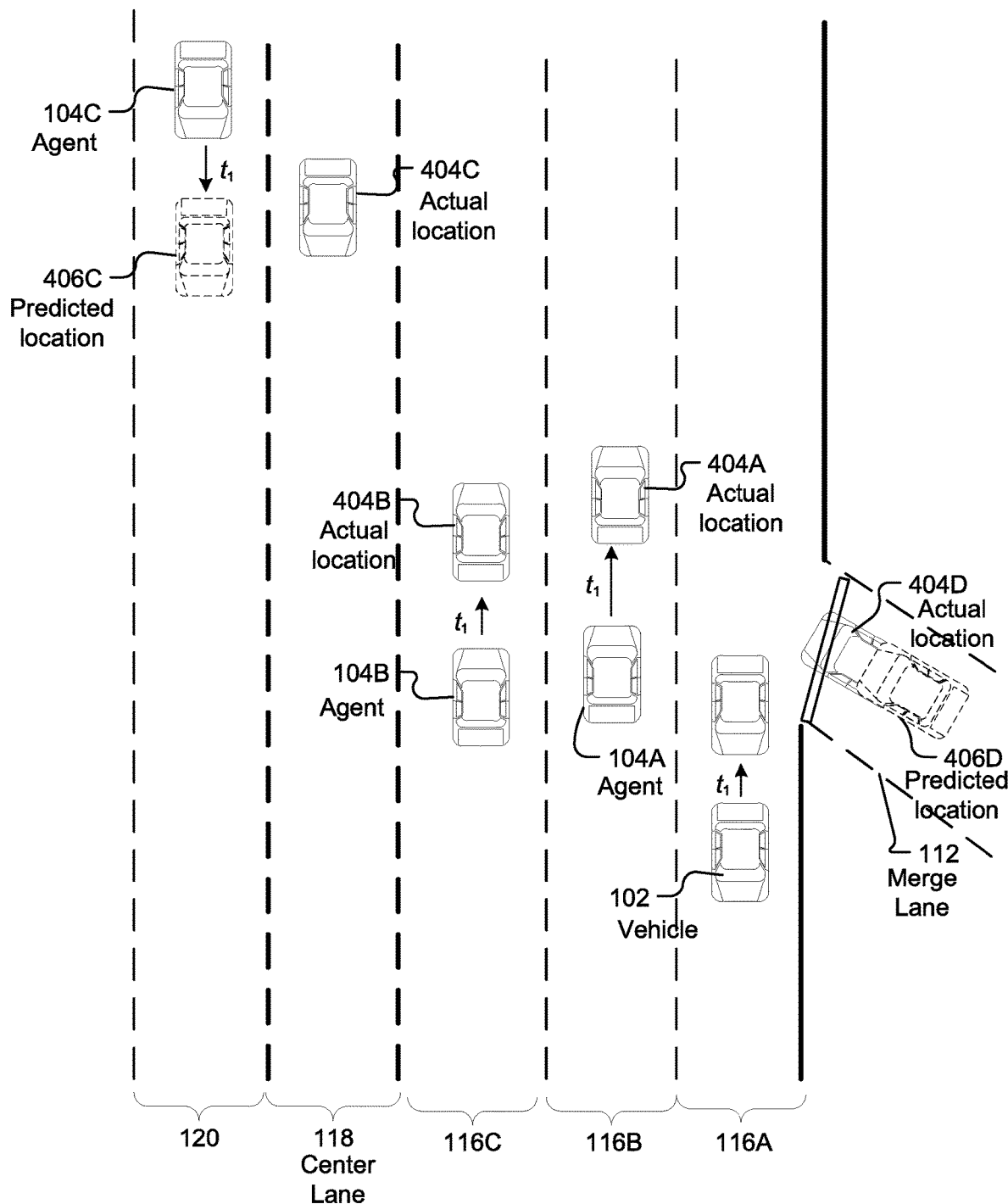
FIG. 4 illustrates an example trajectory comparison of agents.

FIG. 4 illustrates an example trajectory comparison of agents. As described in more detail below, given the contextual environment at time t, the prioritization model may output a predicted position of each agent 104A-104D at future times $t_1$, $t_2$, etc. based on a predicted trajectory of agents 104A-104D. As described in more detail below, during the training of the prioritization model, a trajectory comparison module may compare the prediction of the position of agents 104A-104D at future times $t_1$ and $t_2$ to the ground truth (recorded position) at these times. The prioritization model may be updated based on the accuracy of the predicted position of agents 104A-104D relative to the recorded position of agents 104A-104D. The example of FIG. 4 illustrates a comparison of the predicted position of each agent 104A-104D at future times $t_1$ and $t_2$ with their recorded positions. As an example and not by way of limitation, at time $t_1$, the prioritization model may accurately predict the position of agent 104A at its actual position 404A and the position of agent 104B at its actual location 404B. In contrast, the prioritization model may predict that agent 104C would proceed along lane 120 to predicted location 406C, but actual position 404C of agent 104C was in center left-turn lane 118. Similarly, at time $t_1$, the prioritization model may predict agent 104D would be stationary at predicted location 406D in merge lane 112, where agent 104D had moved closer to the intersection to actual location 404D. In particular embodiments, the prioritization model is updated based on this comparison of the predicted locations (e.g., 406D) with actual locations (e.g., 404D) of agents 104A-104D.

Figure 5:
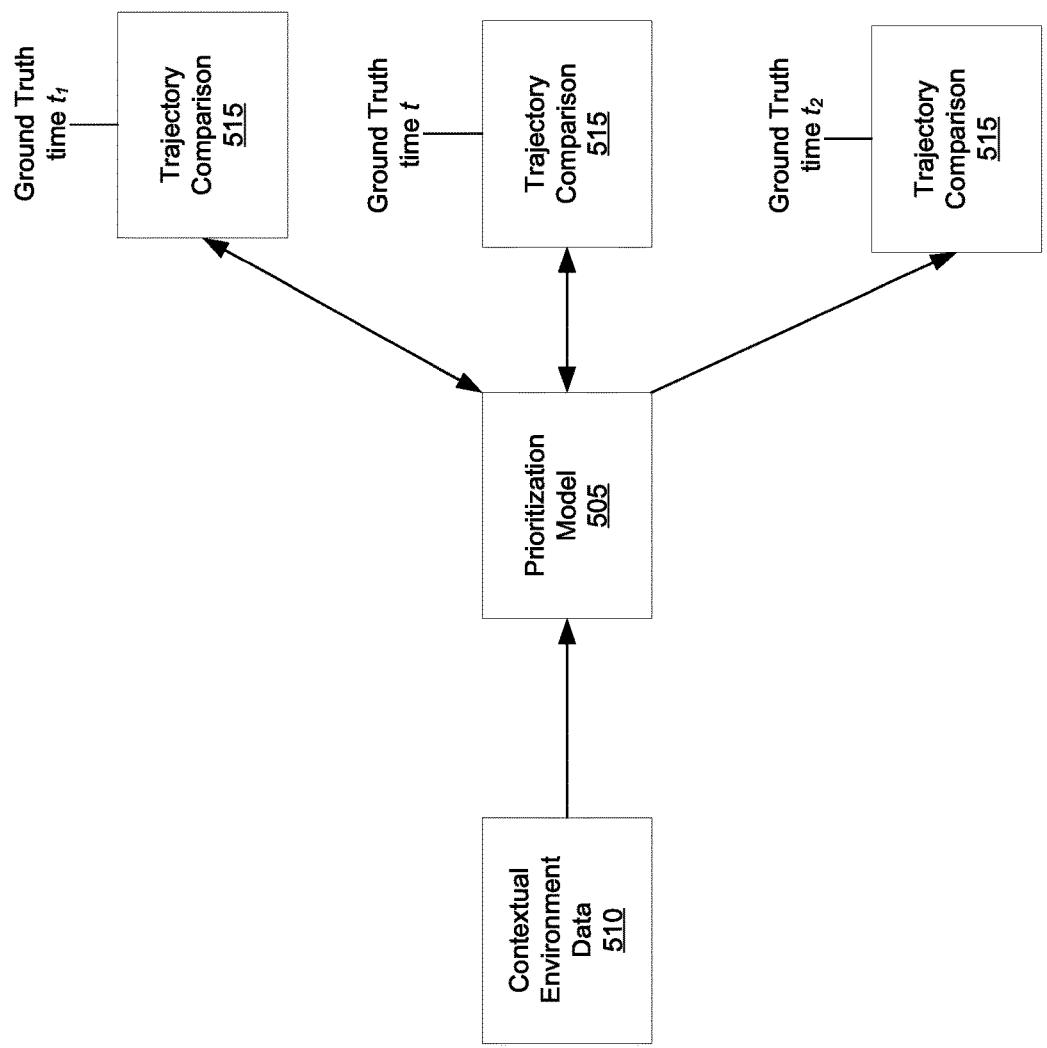
FIG. 5 illustrates an example machine-learning training diagram.

FIG. 5 illustrates an example machine-learning training diagram. A prioritization model 505 may be trained to determine a probability distribution of one or more agents encroaching the potential travel space of a vehicle at a future time. In addition, prioritization model 505 may determine a prioritization of agents within the environment based on the probability distributions of the agents. As described in more detail below, the perception module of the driving-control navigation pipeline processes state information (including the semantic information of the lanes (e.g., lane graph), traffic rules, agent positions, velocity, acceleration, etc.) of the environment and agents to generate contextual environment data 510. Based on contextual environment data 510, for each agent, prioritization model 505 may generate a predicted probability distribution (e.g., as a function of time)

indicative of whether a predicted trajectory of one or more of the agents may intersect or encroach on the potential travel space of the vehicle.

Contextual environment data 510 is based on data measured by the driving-control system or sensor system of a large number of vehicles. As described below in more detail, the perception module of a driving-control system navigation pipeline may process the available data (e.g., sensor data, data from a high-definition map, etc.) to derive information about the contextual environment. This information may identify agents present in the environment of the vehicle (e.g., other vehicles, pedestrians, moving objects) and determine various characteristics of the agents. As an example and not by way of limitation, the information may provide the velocities, moving directions, accelerations, headings, relative distances, or relative positions of these agents. Contextual environment data 510 may include a semantic map of the lanes of the contextual environment and how the lanes are connected (lane graph), as well as categorical features. Categorical features may include one or more of, for example, but not limited to, a current position of the agent, a past position of the agent, a predicted position of the agent, a current velocity of the agent, a past velocity of the agent, a predicted velocity of the agent, velocities and orientations of traffic agents relative to the agent, velocities and orientations of agents relative to each other, velocities and orientations of agents relative to one or more map elements (e.g., lane markings, stop lines, pedestrian crossings, signals, road signs, intersections, road edges, buildings, road barriers). In particular embodiments, contextual environment data 510 from the perception module driving-control navigation pipeline may include a raster image. The perception module may provide the contextual environment data in any suitable form, such as, for example, an object list.

Prioritization model 505 may determine the probability distribution of each agent encroaching on the potential travel space of the vehicle based on contextual environment data 510. In particular embodiments, prioritization model 505 may generate a feature vector for each agent using contextual environment data 510. As an example and not by way of limitation, the feature vector may include one or more categorical features, described in more detail above. The semantic map and other information of contextual environment data 510 provide data for prioritization model 505 to understand the conditions that particular lanes may be used by agents to enter the potential travel space of the vehicle within the predetermined period of time. In particular embodiments, prioritization model 505 may evaluate different types of conditions for the behavior of the agents with respect to the lanes. These conditions include: 1) the agent at its current position is physically unable to encroach the potential travel space of the vehicle (e.g., due to a barrier or obstacle); 2) the agent at its current position is legally able to encroach the potential travel space of the vehicle; and 3) it is illegal but physically possible (e.g., a yield relationship (yield sign or stop line)) for the agent at its current position to encroach the potential travel space of the vehicle.

Another consideration that may be used to determine the probability distribution may include identifying one or more expected lane sequences associated with a particular action (e.g., a left turn or lane merge) based on the semantic map and information. As an example and not by way of limitation, the lane sequence for an agent to perform a left turn into the potential travel space of the vehicle may involve merging into a center left-turn lane prior to performing the left turn. In particular embodiments, the lane sequence for a particular action may consider a radius of curvature, heading, or speed associated with lane sequence that intersects the potential travel space. As an example and not by way of limitation, an agent may have a velocity that is too high for the agent to perform a lane sequence into a center left-turn lane to then encroach on the potential travel space of the vehicle. In particular embodiments, prioritization model 205 may consider the semantic information in conjunction with historical data when determining the probability distributions. As an example and not by way of limitation, historical data from other vehicles may indicate that an agent at a particular yield relationship may move into a particular intersection. As another example, historical data may indicate that vehicles that come within a particular distance of a particular intersection are less likely to yield to oncoming traffic than vehicles that stop a larger distance from the intersection.

Prioritization model 505 may include a machine-learning model (e.g., a convolutional neural network, a neural network, a decision tree, support vector machines, etc.). Prioritization model 505 may be trained using a large amount (e.g., hundreds or thousands of training samples) of prerecorded contextual data captured by a large number of vehicles (e.g., driven by human drivers, vehicles having a driving-control system, or a combination thereof). Prioritization model 505 may be trained using any suitable training techniques, including using supervised machine learning to learn from labeled training data, unsupervised machine learning to learn from unlabeled training data, or semi-supervised machine learning to learn from both labeled and unlabeled training data. In particular embodiments, where supervised machine learning is used to train prioritization model 505, the training data set may include a large number of training samples (e.g., thousands or millions) gathered from various sources (e.g., data-gathering vehicles with different sensor configurations or equipment).

Prioritization model 505 processes contextual environment data 510 and generates a feature vector for each agent. Prioritization model 505 may use the feature vector of the agents and semantic information to generate data corresponding to an inferred ground truth. In the context of training of prioritization model 505, the ground truth serves as the target or desired output for the associated training sample and may be referred to as the ground truth label for that training sample. In the training phase, trajectory comparison module 515 may compare the predicted probability distribution generated by prioritization model 505 with a ground-truth probability distribution. In particular embodiments, the ground-truth may be generated based on the regression of known state information. As described in more detail above, sensor and vehicle data may be captured at different times t, $t_1$, $t_2$, etc. If the current training iteration assumes the current state to be at time t, then prioritization model 505 generates the probability distribution for the agents at time $t_1$. Based on the prerecorded sensor data indicating the locations of all the agents at time $t_1$, the ground-truth for determining the accuracy of the prediction may be generated.

Trajectory comparison module 515 may compare a predicted environment status of the agents from prioritization model 505 to the actual environment status of the agents. In particular embodiments, the training may be performed using sequences of data so that a movement sequence may serve as a signal for prioritization model 505 to determine the ground truth for the sequence of data. For instance, if the time t contextual environment is represented by a raster image, the output of prioritization module 505 may be another raster image (e.g., a snapshot of the current environment) that depicts where the agents would be at time $t_1$ (e.g., a snapshot of the future). For example, one training sample may be generated based on a sequence of actual sensor data captured by a vehicle at times t and $t_1$.

Prioritization model 505 may generate a series of raster images to predict a series of future scenes of the environment. In particular embodiments, the computing system may compare the predicted environment status (e.g., position or velocity) of the agents to the actual environment status of the agents. The computing system may generate a series of multi-change images for the actual top view of the environment based on the actual vehicle and environment status determined using the subsequent collected contextual data of the vehicle. The computing system may compare the predicted raster images and the recorded raster images. During training, prioritization model 505 may process the first contextual representation using the current configuration parameters or coefficients of prioritization model 505 and output a predicted contextual representation. The predicted contextual representation may then be compared to the known second contextual representation (i.e., the ground-truth at time $t_1$). The comparison may be quantified by a loss value or computed using a loss function. As an example and not by way of limitation, the loss value may correspond to the distance between the predicted position of the agents and actual recorded position of the agents. The loss value may be used (e.g., via back-propagation techniques) to update the configuration parameters of prioritization model 505 so that the loss value would be less if the prediction were to be made again. As illustrated in the example of FIG. 5, prioritization model 505 may receive contextual environment data 510 corresponding to the current state to be at a time t, determine a trajectory at future times $t_1$, $t_2$, etc. of one or more agents identified in contextual environment data 510, and provide predicted trajectories of the agents to trajectory comparison module 515. As described below in more detail, trajectory comparison module 515 may provide training feedback to prioritization model 505 based on the comparison between the predicted locations and actual locations of the agents at times $t_1$, $t_2$, etc.

Figure 6:
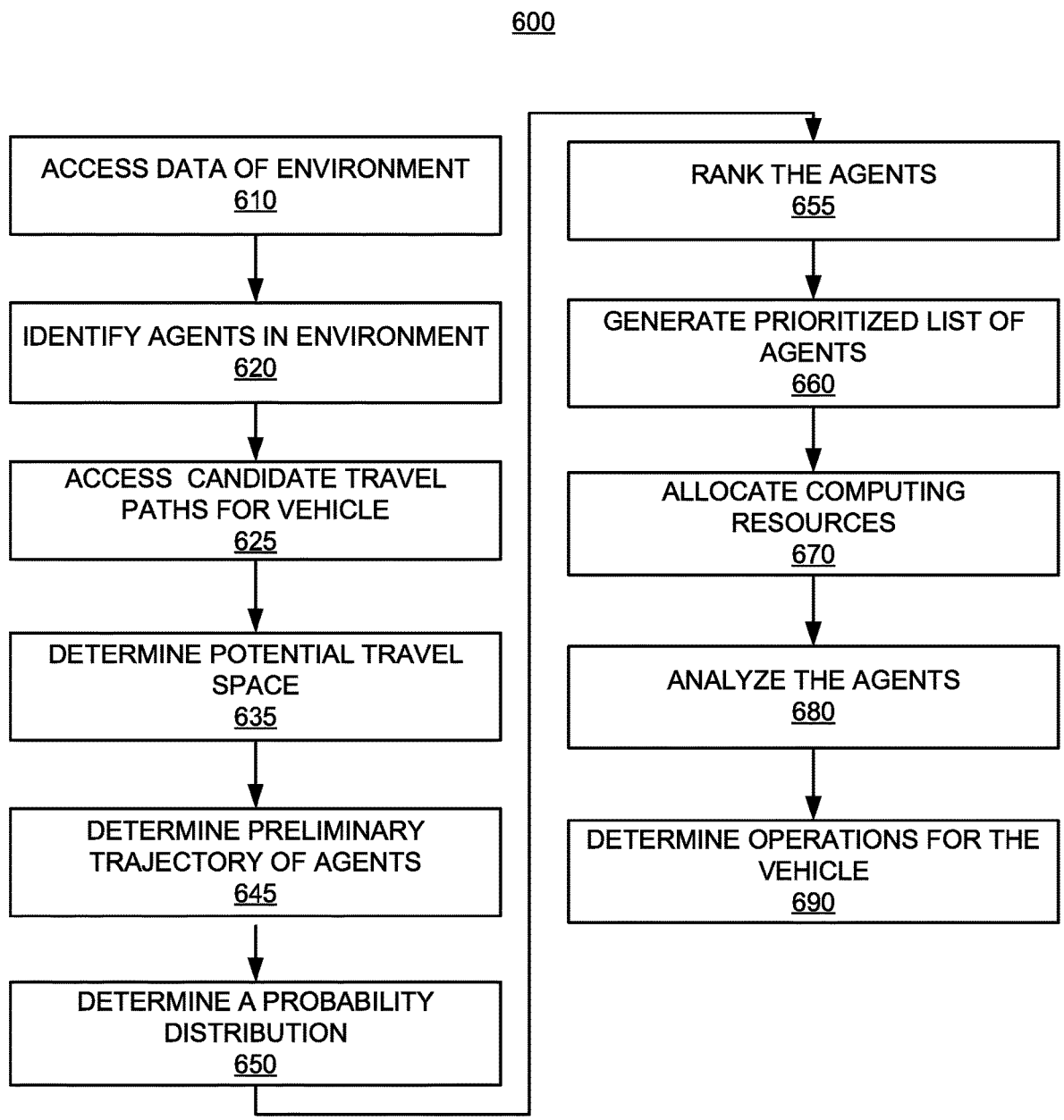
FIG. 6 illustrates an example method for prioritizing agents.

FIG. 6 illustrates an example method for prioritizing agents. The method 600 may begin at step 610, a computing system of a vehicle may access data of an environment of a vehicle. In particular embodiments, the data of the environment may include a raster image. As an example and not by way of limitation, the raster image may include a lane graph, semantic information, velocity of agents, heading of agents, relative distance to agents, or position of agents. Although this disclosure describes and illustrates a particular form of encoding the contextual information (e.g., raster image), this disclosure contemplates any suitable form of encoding the contextual information, such as for example an object list or a vector or matrix of numerical values, with each value in the vector/matrix corresponding to a predetermined category of information, as described below in more detail.

At step, 620, the computing system may identify agents in the environment of the vehicle based on the environment data. In particular embodiments, at step 625, the computing system may access one or more candidate travel paths for the vehicle at a future time. In particular embodiments, at step 635, the computing system may determine a potential travel space that is defined by the candidate travel paths of the vehicle. In particular embodiments, at step 645, the computing system may determine the preliminary trajectory of the one or more agents based on a current position and semantic information associated with the current position. At step 650, the computing system may determine a probability distribution indicative of whether a predicted trajectory of each of the agents intersects a potential travel space of the vehicle. In particular embodiments, at step 655, the computing system may determine a ranking of the agents based on the probability distribution of the one or more agents. At step 660, the computing system may generate a prioritized list of the agents.

At step 670, the computing system may allocate an amount of computing resources of the vehicle for analyzing each of one or more of the agents based on the prioritization and characteristics (e.g., speed or heading) of the respective one or more agents. In particular embodiments, the allocation of computing resources is further based on the probability distribution of the agents being higher than a predetermined threshold value. As an example and not by way of limitation, the computing resources may be proportionally allocated to the agents having the probability distribution higher than the predetermined threshold value. As another example, the computing resources may be proportionally allocated based on the ranking of the agents. In other words, the agents having the highest probability distributions or ranking may be allocated proportionally higher amounts of computing resources. In particular embodiments, the computing system may filter one or more of the agents based on the probability distribution of the one or more agents being lower than a predetermined threshold value. In other words, agents having probability distribution lower than the predetermined threshold value may not be allocated any computing resources. At step 680, the computing system may predict a trajectory of one or more of the agents according to the allocated computing resources. The accuracy of the prediction may be proportional to the amount of allocated computing resources. At step 690, the computing system may determine, based on the analysis of the agents, one or more operations for the vehicle to perform.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for prioritizing agent including the particular steps of the method of FIG. 6, this disclosure contemplates any suitable method for prioritizing agents including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
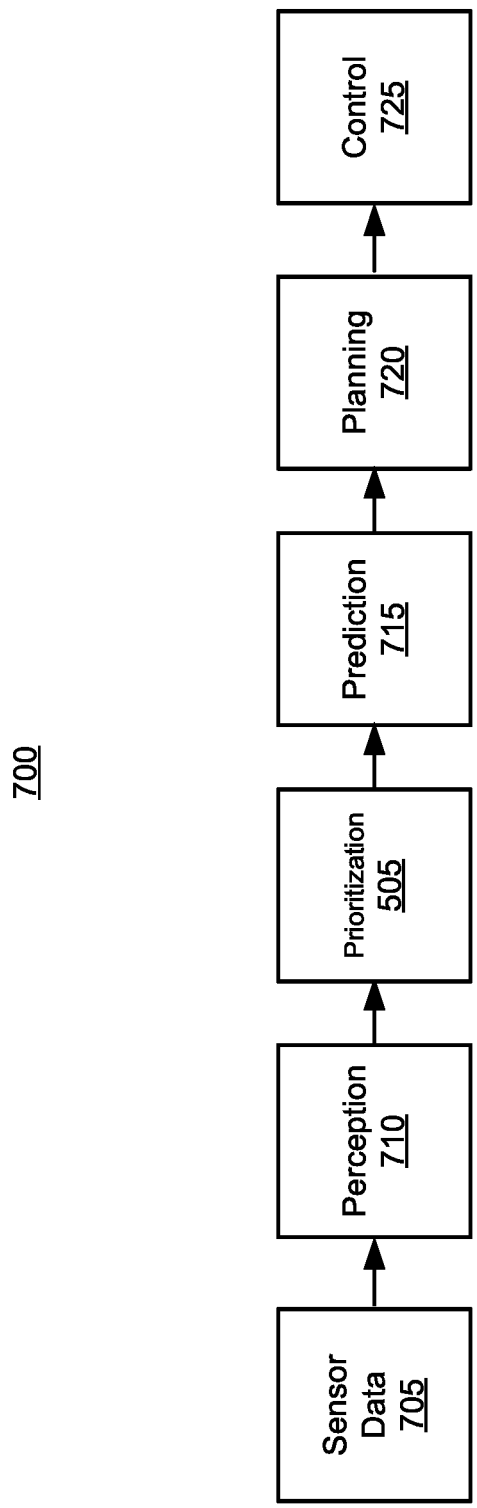
FIG. 7 illustrates an example block diagram of a driving-control navigation pipeline having a prioritization model.

FIG. 7 illustrates an example block diagram of a driving-control navigation pipeline. In particular embodiments, a driving-control navigation pipeline 700 may include a number of computing modules, such as a sensor data module 705, perception module 710, prediction module 715, planning module 720, and control module 725. In particular embodiments, driving-control navigation pipeline 700 may further include a prioritization model 505 that is trained or that has learned the relationship between the contextual environment data and the trajectory of agents in the environment, as described in more detail above. The driving-control system of the vehicle may download prioritization model 505 after prioritization model 505 has been trained, as illustrated and described in the example of FIG. 5.

Sensor data module 705 may obtain and preprocess sensor/telemetry data that is provided to perception module 710. Such data may be captured by any suitable sensors of a vehicle. As an example and not by way of limitation, the vehicle may have a Light Detection and Ranging (LiDAR) sensor that is configured to transmit pulsed laser beams in multiple directions and measure the reflected signal from objects surrounding the vehicle. The time of flight of the light signals may be used to measure the distance or depth of the objects from the LiDAR. As another example, the vehicle may have optical cameras pointing in different directions to capture images of the vehicle's surroundings. Radar may also be used by the vehicle for detecting other vehicles and/or hazards at a distance. As further examples, the vehicle may be equipped with ultrasound for close-range object detection, e.g., parking and obstacle detection or infrared cameras for object detection in low-light situations or darkness. In particular embodiments, sensor data module 705 may suppress noise in the sensor data or normalize the sensor data.

Perception module 710 is responsible for correlating and fusing the data from the different types of sensors of the sensor module 705 to model the contextual environment of the vehicle. Perception module 710 may use information extracted by multiple independent sensors to provide information that would not be available from any single type of sensors. Combining data from multiple sensor types allows the perception module 710 to leverage the strengths of different sensors and more accurately and precisely perceive the environment. As an example and not by way of limitation, image-based object recognition may not work well in low-light conditions. This may be compensated by sensor data from LiDAR or radar, which are effective sensors for measuring distances to targets in low-light conditions. As another example, image-based object recognition may mistakenly determine that an object depicted in a poster is an actual three-dimensional object in the environment. However, if depth information from a LiDAR is also available, the perception module 710 could use that additional information to determine that the object in the poster is not, in fact, a three-dimensional object.

Perception module 710 may process the available data (e.g., sensor data, data from a high-definition map, etc.) to derive information about the contextual environment. For example, perception module 710 may include one or more agent modelers (e.g., object detectors, object classifiers, or machine-learning models trained to derive information from the sensor data) to detect and/or classify agents present in the environment of the vehicle (e.g., other vehicles, pedestrians, moving objects). Perception module 710 may also determine the various characteristics of the agents. For example, perception module 710 may track the velocities, moving directions, accelerations, trajectories, relative distances, or relative positions of these agents. In particular embodiments, perception module 710 may also leverage information from a high-definition map. The high-definition map may include a precise three-dimensional model of the environment, including buildings, curbs, street signs, traffic lights, and any stationary fixtures in the environment. Using the vehicle's GPS data and/or image-based localization techniques (e.g., simultaneous localization and mapping, or SLAM), the perception module 710 could determine the pose (e.g., position and orientation) of the vehicle or the poses of the vehicle's sensors within the high-definition map. The pose information, in turn, may be used by the perception module 710 to query the high-definition map and determine what objects are expected to be in the environment.

Perception module 710 may use the sensor data from one or more types of sensors and/or information derived therefrom to generate a representation of the contextual environment of the vehicle. As an example and not by way of limitation, the representation of the contextual environment may include objects such as other vehicles, curbs, debris, objects, and pedestrians. The contextual representation may be limited to a maximum range of the sensor array (e.g., 50, 100, or 200 meters). The representation of the contextual environment may include information about the agents and objects surrounding the vehicle, as well as semantic information about the traffic lanes, traffic rules, traffic signs, time of day, weather, and/or any other suitable information. The contextual environment may be represented in any suitable manner. As an example and not by way of limitation, the contextual representation may be encoded as a vector or matrix of numerical values, with each value in the vector/matrix corresponding to a predetermined category of information. For example, each agent in the environment may be represented by a sequence of values, starting with the agent's coordinate, classification (e.g., vehicle, pedestrian, etc.), orientation, velocity, trajectory, and so on. Alternatively, information about the contextual environment may be represented by a raster image that visually depicts the agent, semantic information, etc. For example, the raster image may be a birds-eye view of the vehicle and its surroundings, up to a predetermined distance. The raster image may include visual information (e.g., bounding boxes, color-coded shapes, etc.) that represent various data of interest (e.g., vehicles, pedestrians, lanes, buildings, etc.).

In particular embodiments, prioritization model 505 may take into account factors such as, for example, the behavior of the agents with respect to the lanes, one or more expected lane sequences associated with a particular action, or historical data of vehicles with respect to features of the road. In the inference phase, prioritization model 505 processes contextual environment data and generates a feature vector for each agent that is populated with data of one or more categorical features, such as, for example, a current position of the agent, a past position of the agent, a predicted position of the agent, a current velocity of the agent, a past velocity of the agent, a predicted velocity of the agent, velocities and orientations of traffic agents relative to the vehicle, velocities and orientations of agents relative to each other, velocities and orientations of agents relative to one or more map elements. Prioritization model 505 processes the contextual environment data to predict the trajectories of the agents identified in the contextual environment data. Based on the learned relationship between the contextual environment data and the trajectory of agents, prioritization model 505 may determine a probability distribution for each agent that is indicative of whether the predicted trajectory of each agent will intersect the potential travel space of the vehicle. In particular embodiments, the probability distributions correspond to the probability an agent will encroach the potential travel space of the vehicle as a function of time. In particular embodiments, the probability distribution may be modeled using a Gaussian mixture model. A Gaussian mixture model assumes all the data points are generated from a mixture of a number of Gaussian distributions. As an example and not by way of limitation, the probability distribution may be fit to multiple Gaussian distributions turning discrete probability distributions to a continuous distribution. In particular embodiments, prioritization model 505 may determine a position or velocity distribution of each agent as a function of time.

Prioritization model 505 is configured to generate a prioritized list of agents, which may be used by prediction module 715 to allocate computing resources to high priority agents most likely to affect the candidate travel paths of the vehicle. In particular embodiments, prioritization model 505 may rank the agents based on their probability distribution indicating the likelihood the agent will encroach on the potential travel space of the vehicle. As an example and not by way of limitation, prioritization model 505 may integrate the probability distribution over time to determine the predicted probability that a particular agent will encroach the potential travel space of the vehicle in the particular time period. The agents may be ranked from highest to lowest probability of encroaching on the potential travel space of the vehicle. As an example and not by way of limitation, prioritization model 505 may rank agents that have a probability of encroaching on the potential travel space of the vehicle higher than a predetermined threshold value (e.g., >50%). In particular embodiments, prioritization model 505 may generate a prioritized list of agents based on the ranking. In particular embodiments, prediction module 715 may use the predicted trajectory of the agents to allocate computing resources to predict the trajectory or behavior of one or more agents with a high level of accuracy.

The representation of the present contextual environment from the perception module 710 may be consumed by a prediction module 715 to generate one or more predictions of the future environment. For example, given a representation of the contextual environment at time t, prediction module 715 may output another contextual representation for time $t_1$. For instance, if the t contextual environment is represented by a raster image, the output of the prediction module 715 may be another raster image (e.g., a snapshot of the current environment) that depicts where the agents would be at time $t_1$ (e.g., a snapshot of the future). In particular embodiments, prediction module 715 may include a machine-learning model (e.g., a convolutional neural network, a neural network, a decision tree, support vector machines, etc.) that may be trained based on previously recorded contextual and sensor data. For example, one training sample may be generated based on a sequence of actual sensor data captured by a vehicle at times t and $t_1$. The captured data at times t and $t_1$ may be used to generate, respectively, a first contextual representation (the training data) and a second contextual representation (the associated ground-truth used for training). During training, the machine-learning model may process the first contextual representation using the model's current configuration parameters and output a predicted contextual representation. The predicted contextual representation may then be compared to the known second contextual representation (i.e., the ground-truth at time $t_1$). The comparison may be quantified by a loss value, computed using a loss function. The loss value may be used (e.g., via back-propagation techniques) to update the configuration parameters of the machine-learning model so that the loss would be less if the prediction were to be made again. The machine-learning model may be trained iteratively using a large set of training samples until a convergence or termination condition is met. For example, training may terminate when the loss value is below a predetermined threshold. Once trained, the machine-learning model may be used to generate predictions of future contextual representations based on current contextual representations.

Planning module 720 may determine the navigation routes and particular driving operations (e.g., slowing down, speeding up, stopping, swerving, etc.) of the vehicle based on the predicted contextual representation generated by the prediction module 715. In particular embodiments, planning module 720 may utilize the predicted information encoded within the predicted contextual representation (e.g., predicted location or trajectory of agents, semantic data, etc.) and any other available information (e.g., map data, traffic data, accident reports, weather reports, target destinations, and any other suitable information) to determine one or more goals or navigation instructions for the vehicle. As an example and not by way of limitation, based on the predicted behavior of the agents surrounding the vehicle and the traffic data to a particular destination, planning module 720 may determine a particular navigation path and associated driving operations for the vehicle to avoid possible collisions with one or more agents. In particular embodiments, planning module 720 may generate, based on a given predicted contextual presentation, several different plans (e.g., goals or navigation instructions) for the vehicle. For each plan, the planning module 720 may compute a score that represents the desirability of that plan. For example, if the plan would likely result in the vehicle colliding with an agent at a predicted location for that agent, as determined based on the predicted contextual representation, the score for the plan may be penalized accordingly. Another plan that would cause the vehicle to violate traffic rules or take a lengthy detour to avoid possible collisions may also have a score that is penalized, but the penalty may be less severe than the penalty applied for the previous plan that would result in a collision. A third plan that causes the vehicle to simply stop or change lanes to avoid colliding with the agent in the predicted future may receive the highest score. Based on the assigned scores for the plans, the planning module 720 may select the best plan to carry out. While the example above used a collision as an example, the disclosure herein contemplates the use of any suitable scoring criteria, such as travel distance or time, fuel economy, changes to the estimated time of arrival at the destination, passenger comfort, proximity to other vehicles, the confidence score associated with the predicted contextual representation, etc.

Based on the plan generated by planning module 720, which may include one or more navigation path or associated driving operations, control module 725 may determine the specific commands to be issued to the actuators of the vehicle. The actuators of the vehicle are components that are responsible for moving and controlling the vehicle. The actuators control driving functions of the vehicle, such as, for example, steering, turn signals, deceleration (braking), acceleration, gear shift, etc. As an example and not by way of limitation, control module 725 may transmit commands to a steering actuator to maintain a particular steering angle for a particular amount of time to move a vehicle on a particular trajectory to avoid agents predicted to encroach into the area of the vehicle. As another example, control module 725 may transmit commands to an accelerator actuator to have the vehicle safely avoid agents predicted to encroach into the area of the vehicle.

Figure 8:
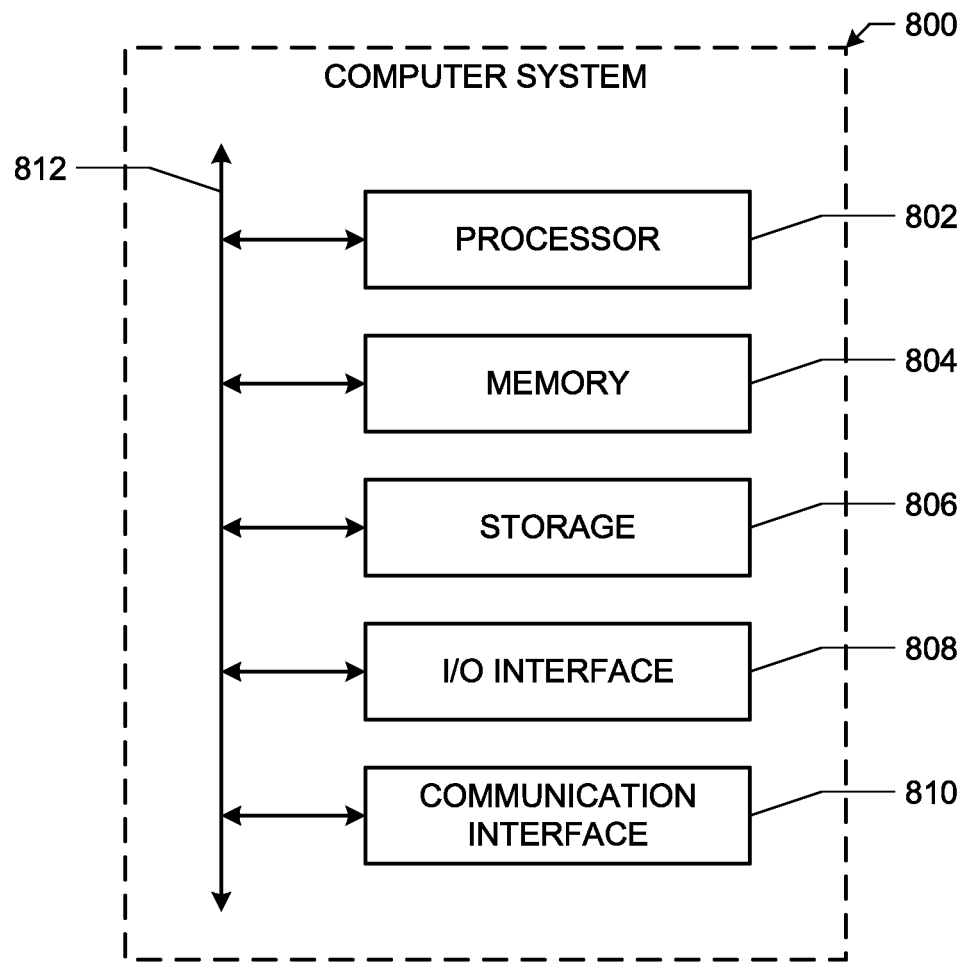
FIG. 8 illustrates an example of a computing system.

FIG. 8 illustrates an example computer system. In particular embodiments, one or more computer systems 800 perform one or more steps of one or more methods described or illustrated herein. In particular embodiments, one or more computer systems 800 provide the functionalities described or illustrated herein. In particular embodiments, software running on one or more computer systems 800 performs one or more steps of one or more methods described or illustrated herein or provides the functionalities described or illustrated herein. Particular embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system of a vehicle:
    acquiring, using at least one sensor of the vehicle, sensor data associated with an environment of the vehicle;
    identifying agents in the environment based on the sensor data;
    generating a prioritization of the agents for allocating computer resources of the vehicle based on a probability distribution indicative of whether a preliminary trajectory of each of the agents intersects a potential travel space of the vehicle;

allocating an amount of the computing resources of the vehicle for analyzing each of the agents proportional to the prioritization and characteristics of the agents;

predicting a trajectory of one or more of the agents according to the allocated computing resources, wherein predicting the trajectory includes generating the trajectory with an accuracy that is proportional to the amount of allocated computing resources; and controlling the vehicle using one or more operations that are based, at least in part, on analysis of the trajectory for the one or more agents.

2. The method of claim 1, further comprising:

accessing one or more candidate travel paths for the vehicle; and determining the potential travel space that is defined by the one or more candidate travel paths of the vehicle.

3. The method of claim 1, further comprising ranking the agents based on the agents having a highest probability distribution indicating the trajectory of the agents intersects the potential travel space of the vehicle, wherein allocating the computing resources of the vehicle further predicts the trajectory of one or more of the agents based on the ranking.

4. The method of claim 1, wherein allocating the computing resources is further based on the probability distribution of the agents being higher than a predetermined threshold value.

5. The method of claim 4, wherein allocating the computing resources includes proportionally allocating to the agents having the probability distribution higher than the predetermined threshold value.

6. The method of claim 1, wherein the prioritization of the agents filters one or more of the agents based on the probability distribution of the one or more agents being lower than a predetermined threshold value.

7. The method of claim 1, wherein determining the probability distribution comprises:

determining whether one or more of the agents are physically able to encroach the potential travel space based on a lane graph associated with a position of the one or more agents;

determining whether one or more of the agents are legally able to encroach the potential travel space based on the lane graph; and determining whether one or more of the agents are physically able to or legally able to encroach the potential travel space.

8. The method of claim 1, wherein determining the probability distribution comprises:

determining a lane sequence associated with the trajectory of one or more of the agents based on a position of the agents and a lane graph; and determining the probability distribution of one or more of the agents based on the lane sequence and semantic map information of the position of the agents.

9. The method of claim 1, wherein contextual environment data of the vehicle comprises at least one of a lane graph, semantic map information, velocity of each of the agents, heading of each of the agents, relative distance to each of the agents, or position of each of the agents.

10. The method of claim 9, wherein the contextual environment data is encoded as a raster image or list of objects and metadata in an area surrounding the vehicle.

11. One or more computer-readable non-transitory storage media embodying software that is operable when executed to cause one or more processors to perform operations comprising:

acquiring, using at least one sensor of a vehicle, sensor data associated with an environment of the vehicle;

identifying agents in the environment based on the sensor data;

generating a prioritization of the agents for allocating computer resources of the vehicle based on a probability distribution indicative of whether a preliminary trajectory of each of the agents intersects a potential travel space of the vehicle;

allocating an amount of the computing resources of the vehicle for analyzing each of the agents proportional to the prioritization and characteristics of the agents;

predicting a trajectory of one or more of the agents according to the allocated computing resources, wherein predicting the trajectory includes generating the trajectory with an accuracy that is proportional to the amount of allocated computing resources; and controlling the vehicle using one or more operations that are based, at least in part, on analysis of the trajectory for the one or more agents.

12. The media of claim 11, wherein the software is further operable to: access one or more candidate travel paths for the vehicle; and determine the potential travel space that is defined by the one or more candidate travel paths of the vehicle.

13. The media of claim 11, wherein the software is further operable to rank the agents based on the agents having a highest probability distribution indicating the trajectory of the agents intersects the potential travel space of the vehicle, wherein the computing resources of the vehicle are allocated to further predict the trajectory of one or more of the agents based on the ranking.

14. The media of claim 11, wherein the allocation of computing resources is further based on the probability distribution of the agents being higher than a predetermined threshold value.

15. The media of claim 11, wherein the computing resources are proportionally allocated to the agents having the probability distribution higher than a predetermined threshold value.

16. A computing system comprising:

one or more processors; and one or more computer-readable non-transitory storage media coupled to one or more of the processors, the one or more computer-readable non-transitory storage media comprising instructions operable when executed by one or more of the processors to cause the computing system to perform operations comprising:

acquiring, using at least one sensor of a vehicle, sensor data associated with an environment of the vehicle;

identifying agents in the environment based on the sensor data;

generating a prioritization of the agents for allocating computer resources of the vehicle based on a probability distribution indicative of whether a preliminary trajectory of each of the agents intersects a potential travel space of the vehicle;

allocating an amount of the computing resources of the vehicle for analyzing each of the agents proportional to the prioritization and characteristics of the agents;

predicting a trajectory of one or more of the agents according to the allocated computing resources, wherein predicting the trajectory includes generating the trajectory with an accuracy that is proportional to the amount of allocated computing resources; and controlling the vehicle using one or more operations that are based, at least in part, on analysis of the trajectory for the one or more agents.

17. The system of claim 16, wherein the instruction further include instructions operable to:

access one or more candidate travel paths for the vehicle; and determine the potential travel space that is defined by the one or more candidate travel paths of the vehicle.

18. The system of claim 16, wherein the instruction further include instructions operable to rank the agents based on the agents having a highest probability distribution indicating the trajectory of the agents intersects the potential travel space of the vehicle, wherein the computing resources of the vehicle are allocated to further predict the trajectory of one or more of the agents based on the ranking.

19. The system of claim 16, wherein the allocation of computing resources is further based on the probability distribution of the agents being higher than a predetermined threshold value.

20. The system of claim 16, wherein the computing resources are proportionally allocated to the agents having the probability distribution higher than a predetermined threshold value.

* * * * *